(12) United States Patent
Fabiani et al.

(10) Patent No.: US 6,549,883 B2
(45) Date of Patent: *Apr. 15, 2003

(54) METHOD AND APPARATUS FOR GENERATING MULTILINGUAL TRANSCRIPTION GROUPS

(75) Inventors: Marc A. Fabiani, Outremont (CA); Michael G. Sabourin, St. Lambert (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/432,697

(22) Filed: Nov. 2, 1999

(65) Prior Publication Data

US 2002/0173945 A1 Nov. 21, 2002

(51) Int. Cl.$^7$ .......................... G06F 17/21; G06F 17/20
(52) U.S. Cl. .............................. 704/10; 704/8
(58) Field of Search .............................. 704/10, 9, 200, 704/235, 1, 3, 8; 707/102, 532

(56) References Cited

U.S. PATENT DOCUMENTS 5,535,120 A * 7/1996 Chong et al. ................... 704/3
6,167,405 A * 12/2000 Rosensteel, Jr. et al. ..... 707/102
6,256,605 B1 * 7/2001 MacMillan ..................... 704/1

OTHER PUBLICATIONS

"N–Gram Based Text Categorization," Cavnar, W.B., et al. 1994 Symposium on Document Analysis and Information Retrieval, pp. 161–176.

Multilingual Sentence Categorization According to Language, Giguet, E. (1995), Proceedings of the European Chapter of the Association for Computational Linguistics SIGDAT Workshop, "From Text to Tags: Issues in Multilingual Language Analysis," pp. 73–76, Dublin, Ireland.

"Automatic Language Identification of Telephone Speech Messages Using Phoneme Recognition and N–Gram Modeling," ICASSP, 1994, Proceedings, vol. 1, pp. 305–308, Apr., 1994, Zissman, M.A.

"Automatic Language Identification Using Goussian Mixture and Hidden Markov Models," ICASSP, 1993, Proceedings, vol. 2, pp. 309–402, Apr. 1993, Zissman, M.A.

"Automatic Rule–Based Generation of Word Pronunciation Networks," Cremelie, Nick, et al., ISSM 1018–4074, pp. 2459–2462, 1997.

* cited by examiner

Primary Examiner—Doris H. To
Assistant Examiner—Daniel Nolan
(74) Attorney, Agent, or Firm—Kevin L. Smith

(57) ABSTRACT

The invention relates to a method and apparatus for generating transcriptions suitable for use in a speech-processing device. The invention provides processing the vocabulary item to derive a characteristic from the vocabulary item allowing to divide a pool of available languages in a first sub-group and a second sub-group. The vocabulary item manifests a higher probability of belonging to any one of the languages in the first sub-group than belonging to any language in the second sub-group. The invention further provides processing the vocabulary item to generate a group of transcriptions, the group of transcriptions being characterized by the absence of at least one transcription belonging to a language in the second sub-group of languages established for the vocabulary item. The group of transcriptions is then released for use by a speech-processing device.

20 Claims, 9 Drawing Sheets

METHOD AND APPARATUS FOR GENERATING MULTILINGUAL TRANSCRIPTION GROUPS

FIELD OF THE INVENTION

This invention relates to the field of speech recognition and speech synthesis. This invention is particularly applicable to the generation of speech recognition dictionaries including transcriptions for use in speech recognition systems as may be used in a telephone directory assistance system, voice activated dialing (VAD) system, personal voice dialing system and other speech recognition enabled services. This invention is also applicable to text to speech synthesizers for generating suitable pronunciations of vocabulary items.

BACKGROUND OF THE INVENTION

Speech recognition enabled services are more and more popular today. The services may include stock quotes, directory assistance, reservations and many others.

In typical speech recognition systems, tie user enters his request using isolated word, connected word or continuous speech via a microphone or telephone set. If valid speech is detected, the speech recognition layer of the system is invoked in an attempt to recognize the unknown utterance. Typically, entries in a speech recognition dictionary are scored in order to determine the most likely match to the utterance. The recognition of speech involves aligning an input audio signal with the most appropriate target speech model.

Speech recognition dictionaries used in such speech recognition systems typically comprise a group of transcriptions associated to a given vocabulary item. A transcription is a representation of the pronunciation of the associated vocabulary item when uttered by a human. Typically, a transcription is the acoustic representation a vocabulary item as a sequence of sub-transcription units. A number of acoustic sub-transcription units can be used in a transcription such as phonemes, allophones, triphones, syllables and dyads (demi-syllables). Commonly, the phoneme is used as the sub-transcription unit and the representation in such case is designated as "phonemic transcription".

In most cases, multiple transcriptions are provided for each vocabulary item thereby allowing for different pronunciations of the vocabulary item. Typically, a limit on the total number of transcriptions in a speech recognition dictionary is imposed due to the inherent computational limits of the speech recognizer as well as due to the memory requirements for storing the transcriptions. Commonly, the limit on the total number of transcriptions is put into practice by limiting the maximum number of transcriptions stored for each vocabulary item.

Of particular interest here are multi-lingual pronunciations. A common method is to provide for each vocabulary item and for each language that the dictionary is desirous to support a transcription in order to account for the different possible pronunciations of the vocabulary item in the different languages. A specific example will better illustrate this method. Suppose the vocabulary item "Robert" and the languages that the dictionary is desirous to support are comprised of French, English, German, Russian and Spanish. The dictionary will comprise five transcriptions for each vocabulary item, one transcription for each language.

A deficiency of the above-described method is that the above-described method does not provide any mechanism for including language probability information in the selection of the transcriptions. Consequently, a large number of transcriptions having a low likelihood of being used by a speech processing device are stored taking up memory space and increase the computational load of speech processing devices making use of the transcriptions since more transcriptions have to be scored. Continuing the specific example of the vocabulary item "Robert", it is unlikely for this vocabulary item to be pronounced on the basis of a Russian pronunciation since "Robert" is an uncommon name in that language.

Thus, there exists a need in the industry to refine the process of generating a group of transcriptions capable of being used by a speech processing device such as a speech recognition dictionary or a text to speech synthesizer.

SUMMARY OF THE INVENTION

A method and apparatus for generating transcriptions suitable for use in a speech-processing device. The invention provides processing the vocabulary item to derive a characteristic from the vocabulary item allowing to divide a pool of available languages in a first sub-group and a second sub-group. The vocabulary item has a higher probability of belonging to any one of the languages in the first sub-group than belonging to any language in the second sub-group. The invention further provides processing the vocabulary item to generate a group of transcriptions, the group of transcriptions characterized by the absence of at least one transcription belong to a language in the second sub-group of languages.

The advantage of this data structure over prior art data structures resides in the reduction of unnecessary transcriptions.

In a specific example of implementation, the vocabulary items in the sub-set are further associated to transcriptions belonging to a common default language.

Preferably but not essentially, a characteristic allowing to divide the pool of available languages in the first sub-group and the second sub-group is the etymology of the vocabulary item.

In accordance with another broad aspect, the invention further provides a method for generating a group of transcriptions suitable for use in a speech processing device. The method comprises providing a vocabulary item and processing it to derive a characteristic allowing to divide a pool of available languages in a first sub-group and a second sub-group. The vocabulary item manifests a higher probability of belonging to any language in the first sub-group than belonging to a language in the second sub-group. The method further comprises processing the vocabulary item to generate a group of transcriptions, the group of transcriptions being characterized by the absence of at least one transcription belonging to a language in the second sub-group of languages established for the vocabulary item. Optionally, the method further comprises storing the group of transcriptions on a computer readable storage medium in a format suitable for use by a speech-processing device.

Preferably but not essentially, the method provides processing the vocabulary item to generate transcriptions corresponding to each language belonging to the first sub-group.

Preferably but not essentially, the characteristic allowing to divide the pool of available languages in the first sub-group and the second sub-group is the etymology of the vocabulary item.

In accordance with another broad aspect, the invention further provides an apparatus for implementing the above-described method.

In accordance with another broad aspect, the invention provides a computer readable medium comprising a program element suitable for execution by a computing apparatus for implementing the above-described method.

In accordance with another broad aspect, the invention further provides a computer readable medium containing a speech recognition dictionary comprising transcriptions generated by the above-described method.

Other aspects and features of the present invention will become apparent to those ordinarily skilled in the art upon review of the following description of specific embodiments of the invention in conjunction with the accompanying figures.

DETAILED DESCRIPTION

Figure 1:
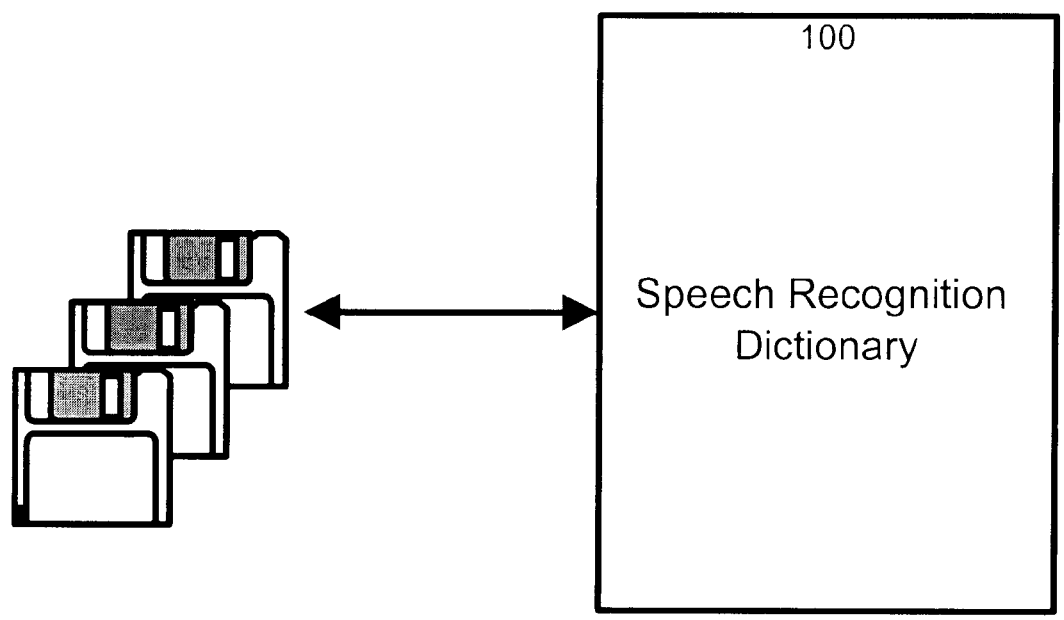
FIG. 1 is a graphical representation of a computer readable medium holding a speech recognition dictionary comprising transcriptions in accordance with an embodiment of the invention.

In a preferred form of implementation, as shown in FIG. 1, the invention provides a computer readable storage medium comprising a data structure containing a speech recognition dictionary 100. The speech recognition dictionary 100 is suitable for use in a speech recognizer. The speech recognition dictionary comprises a set of vocabulary items, the set of vocabulary items including a sub-set of vocabulary items. This is to say that a number of vocabulary items from the set can be arbitrarily associated together to form the sub-set. The sub-set can includes more than one vocabulary item. Each vocabulary item in the sub-set is associated to a group of transcriptions belonging to languages selected from a pool of available languages. The data structure can be assimilated to a table having entries associated to two types of data elements namely vocabulary items, such as orthographic representations of a word and transcriptions. The table below shows a specific example of an entry for the vocabulary item "Nygaard".

| Vocabulary Item | Transcriptions | |
|---|---|---|
| Nygaard | /naIgArd/ | (English) |
| | /nugo/ | (Danish) |

The data structure may also comprise flexible components such as linked lists allowing the memory to be dynamically allocated to each vocabulary item on a per need basis such as to allow a variable number of transcriptions to be associated to given vocabulary items. Many forms of data structures can be used here without detracting from the spirit of the invention provided they allow a correspondence between a vocabulary item and a group of transcriptions to be established.

Each vocabulary item in the sub-set of vocabulary items has characteristics allowing the division of the pool of available languages into a first sub-group and a second sub-group, the vocabulary item manifesting a higher probability of belonging to any language in the first sub-group than belonging to a language in the second sub-group. The group of transcriptions associated with each vocabulary item is characterized by the absence of at least one transcription belonging to a language in the second sub-group of languages established for the vocabulary item.

In a specific example of implementation, a characteristic allowing dividing the pool of available languages in the first sub-group and the second sub-group is the etymology of the vocabulary item.

In a specific example of implementation, all the vocabulary items in the sub-set are further associated to transcriptions belonging to a common default language. In a specific example, the default language may be the language most commonly used by a user of the speech-recognizer that will make use of the speech recognition dictionary 100. For example, if the invention is embodied in a product for use in North America such as a directory assistance system, a possible default language is English since a large proportion of the population is English speaking. In yet another variant, a collection of languages can be used as default languages. Continuing the example of a product intended for sale in North America, a collection of default languages comprising English, French and Spanish may be used.

Advantageously, providing for each vocabulary item a transcription associated to a common default language in addition to transcriptions associated to a language related to the etymology of the vocabulary item allows accounting for both types of pronunciations. This is to say that this accounts for the most common type of pronunciation (in the common default language) and also for the pronunciation in a language of origin of the vocabulary item.

Figure 2:
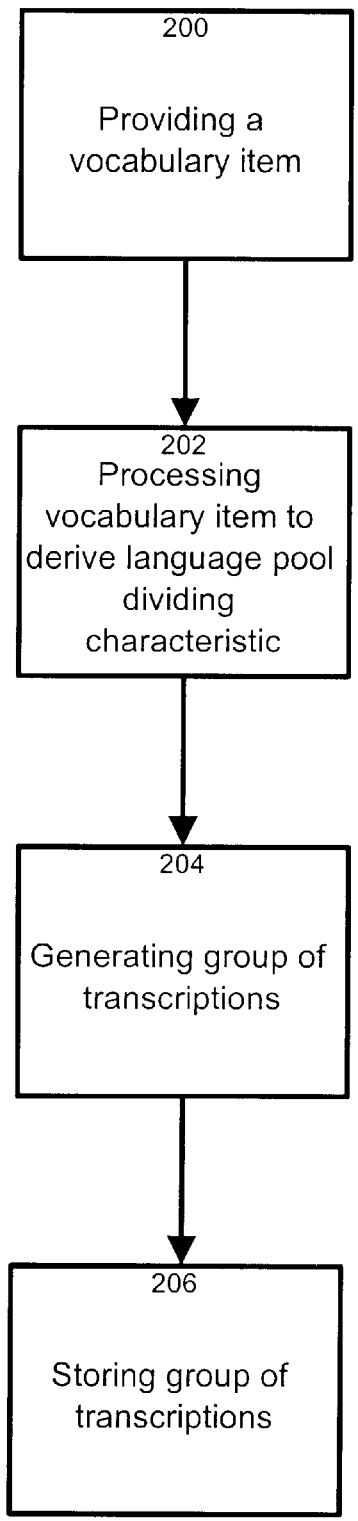
FIG. 2 shows a flow diagram of a method for generating a group of transcriptions in accordance with an embodiment of the invention.

In accordance with another aspect, the invention also provides a method for generating transcriptions suitable for use in a speech-processing device. Specific examples of speech processing devices include speech recognizers and speech synthesizers. As shown in FIG. 2 of the drawings, the method comprises providing at step 200 a vocabulary item. In a specific example of implementation, step 200 is effected by providing a computer readable medium such as a diskette, hard drive, data channel, CD-ROM or any other suitable device, containing an electronic representation of the vocabulary item such as an orthography.

The method further comprises processing 202 the vocabulary item received at step 200 to derive a characteristic allowing the division of a pool of available languages into a first sub-group and a second sub-group, the vocabulary item manifesting a higher probability of belonging to any language in the first sub-group than belonging to a language in the second sub-group. In a specific example of implementation, this is effected by determining the etymological origin of the vocabulary item and assigning likelihood values to the languages in the pool of available languages, the likelihood values being based at least in part on the determined etymological origin of the vocabulary item. For example, a likelihood value for a certain language is the probability that the vocabulary item belongs to this language. The pool of available languages may be comprised of any number of languages. The first sub-group is comprised of languages having likelihood values above a certain threshold and the second sub-group is comprised of languages having likelihood values below a certain threshold. The threshold may be predefined or may be variable (such as dynamically set) without detracting from the spirit of the invention. Alternatively, the first sub-group may be comprised of a fixed number of languages having the highest likelihood values in the pool of languages. Many methods well-known in the art can be used to determine the etymological origin of a vocabulary item. In a specific example of implementation, an onomastic process is used to assign language likelihood values to vocabulary items. An example of an onomastic process that may be used here is a text based language identification algorithm that determines the likelihood and associated probability value of the language on the basis of the orthography of the vocabulary item. As a variant, a phonetician or operator using heuristic measures may assign language probabilities to each vocabulary item. For more information on determining the etymological origin a vocabulary item, the reader is invited to consult Cavnar, W. B. et al. (1994), "N-gram based text categorization", 1994 Symposium On Document Analysis and Information Retrieval", pp. 161–176; Giguet E. (1995), Multilingual Sentence Categorization according to Language, Proceedings of the European Chapter of the Association for Computational Linguistics SIGDAT Workshop "From text to Tags: *Issues in Multilingual Language Analysis*", pp73–76, Dublin Ireland; Zissman, M. A. et al., "Automatic Language Identification of Telephone Speech Messages Using Phoneme Recognition and N-Gram Modeling", ICASSP '94 Proceedings, Vol. 1, pp.305–308, April 1994; Zissman, M. A., "Automatic Language Identification using Gaussian Mixture and Hidden Markov Models", ICASSP '93 Proceedings, Vol. 2, pp399–402, April 1993. The content of these documents is hereby incorporated by reference.

The above will best be understood in connection with the following example. Suppose that the pool of available languages is comprised of the following languages: French, German, Dutch, Spanish, Italian and Russian} and that the vocabulary item is "Nygaard". Step 202 derives characteristics from the vocabulary item allowing to divide the pool of languages. Suppose that the likelihood values assigned to the languages in the pool for vocabulary item "Nygaard" are as follows:

P(French|Nygaard)=0.06
P(German| Nygaard)=0.02
P(Dutch| Nygaard)=0.50
P(Spanish| Nygaard)=0.10
P(Italian| Nygaard)=0.04
P(Russian| Nygaard)=0.01

If the threshold is set to 0.4 then the language {Dutch} belongs to the first sub-group and languages {French, Spanish, Italian, German and Russian} belong to the second sub-group. It is to be noted that the assignment of language likelihood values need not be a precise measure of the probability of the vocabulary item being used in the language. The language likelihood values may be based on generalized statistics that were trained in a separate procedure using a training set.

At step 204 the vocabulary item is processed to generate a group of transcriptions, the group of transcriptions being characterized by the absence of at least one transcription belonging to a language in the second sub-group of languages established for the vocabulary item. Step 204 is effected by using an automatic transcription method such as text to phoneme rules or by using a transcription dictionary for each respective selected language. Such automatic transcription methods are well-known in the art to which this invention pertains. For more information on the generation of word transcriptions, the reader is invited to consult "Automatic Rule-Based Generation of Word Pronunciation Networks" Nick Cremelie et al., ISSM 1018–4074, pp.2459–2462, 1997 whose content is hereby incorporated by reference.

In a first form of implementation, a transcription is generated for each language in the pool of languages. Following this, the pool of languages is divided in a first sub-group and a second sub-group. Only the transcriptions associated to languages in the first sub-group are retained.

In a second form of implementation, transcriptions are generated only for the languages in the first sub-group. This requires that the pool of languages is first divided in first and second sub-groups, and then the transcriptions are generated.

As a variant, the vocabulary item is further processed to generate a transcription corresponding to a default language that is common among all the vocabulary items. In other words, each vocabulary item in the sub-set will have a transcription in the common default language. In a specific example, the default language may be the language most commonly used by a user of the speech-processing device. For example, if the invention is embodied in a product for use in North America such as a directory assistance system, a possible default language is English since a large proportion of the population is English speaking. As yet another possibility a group of languages can be used as common default languages instead of a single language. Continuing the example of a product intended for sale in North America, a group of default languages comprising English, French and Spanish may be used.

Figure 3:
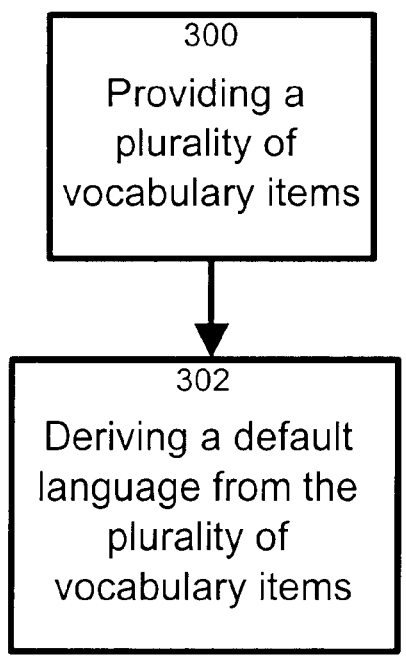
FIG. 3 shows a flow diagram of a method for deriving a default language in accordance with an alternative embodiment of the invention.

In yet another form of implementation, the default language or group of default languages is not fixed but dynamically established based on an examination of a plurality of vocabulary items. As shown in FIG. 3 of the drawings, this may be effected by providing 300 a plurality of vocabulary items and deriving 302 on a basis of the plurality of vocabulary items one or more default languages. In a specific example, each vocabulary item in the plurality of vocabulary items is processed to determine its respective most likely etymological root language. Determining the most likely etymological root language for each vocabulary item may be effected in a similar fashion as previously described in connection with step 202. The respective most likely etymological root languages for the vocabulary items are then combined and the most frequently occurring language, (or languages in the case of a collection of default languages) is (are) used as the default language(s) for the entire sub-set of vocabulary items.

In yet another form of implementation, the method further provides mapping sub-transcription units of a transcription of first language to sub-transcription units in a collection of reference sub-transcription units, each sub-transcription unit in the collection of reference sub-transcription units being associated to a speech model in the speech processing device that will make use of the transcriptions. Preferably, the sub-transcription units of the transcriptions from languages in the first sub-group of languages are mapped onto sub-transcription units of the default language. This is particularly useful if a sub-transcription unit of a language in the first sub-group does not exist in the collection of reference sub-transcription units and a specific speech model is thus not available. In a typical interaction, a transcription sub-transcription is processed to determine whether each sub-transcription unit thereof has a speech model available in the collection of reference sub-transcription units. In the affirmative, the transcription is released unmodified. In the negative, the sub-transcription unit(s) that does not have a speech model available in the collection of reference sub-transcription units is processed to derive a substitute sub-transcription unit from the collection of reference sub-transcription units that is acoustically similar to the sub-transcription unit(s) that does not have a speech model available. The sub-transcription unit(s) that does not have a speech model available is then replaced in the transcription by the substitute sub-transcription unit(s). The modified transcription is then released. In the specific example where the sub-transcription units are phonemes, a nearest phoneme method is used for the substitution process. The nearest phoneme method is described in detail below in particular with reference to block 708 of FIG. 7. In its broad aspect, a nearest phoneme method maps phoneme A to a phoneme B that is acoustically similar to phoneme A residing in a collection of phonemes. The acoustical similarity between phonemes may be established by a human that determines the closest sounding phoneme and establishes a mapping or by a heuristic algorithm implemented on a computer readable medium.

The invention further provides storing 206 the group of transcriptions in a format suitable for use by a speech processing device. In a specific example, an electronic representation of the group of transcriptions is stored on a computer readable medium such as mass-storage medium, diskette, ROM unit or any other suitable device.

Other variants of the above-described method will be readily apparent to those skilled in the art to which this invention pertains.

Figure 4:
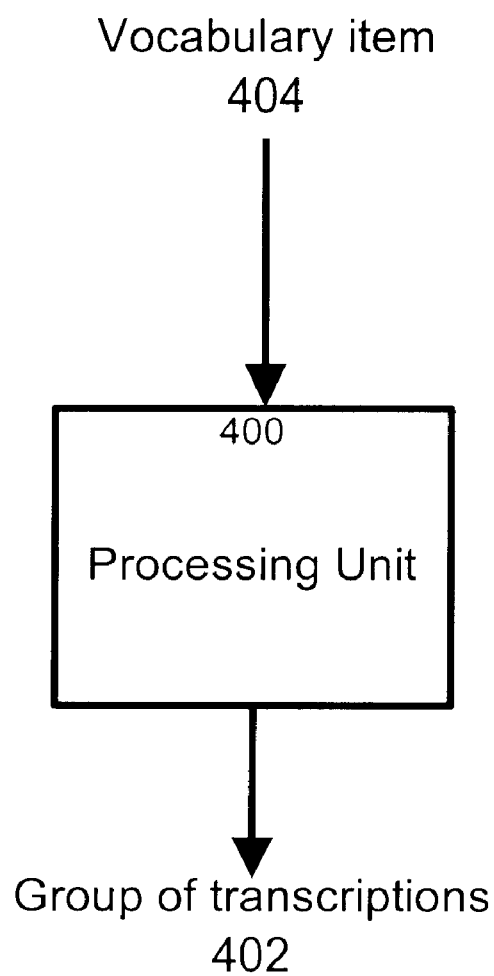
FIG. 4 shows a high-level block diagram of an apparatus for generating a group of transcriptions in accordance with the invention.

In accordance with a third form of implementation, as shown in FIG. 4, the invention provides an apparatus for generating a group of transcriptions suitable for use in a speech-processing device. The apparatus comprises an input 404 for receiving data elements representative of a vocabulary items, a processing unit 400 coupled to the input 404 and an output 402 coupled to the processing unit 400 for releasing the group of transcriptions in a format suitable for use by a speech processing device. The processing unit 400 is adapted to implement the method described in connection with FIG. 2 of the drawings and optionally the variants on the method described in connection with FIGS. 2 and 3 of the drawings.

In a specific example of implementation, the apparatus depicted in FIG. 4 comprises a processor coupled to a computer readable storage medium, the computer readable storage medium comprising a program element for execution by the processor for implementing the processing unit 400. As a variant, the processing unit 400 is a hardware device such as a ROM or other chip, programmed on the basis of the above-described method.

Figure 5:
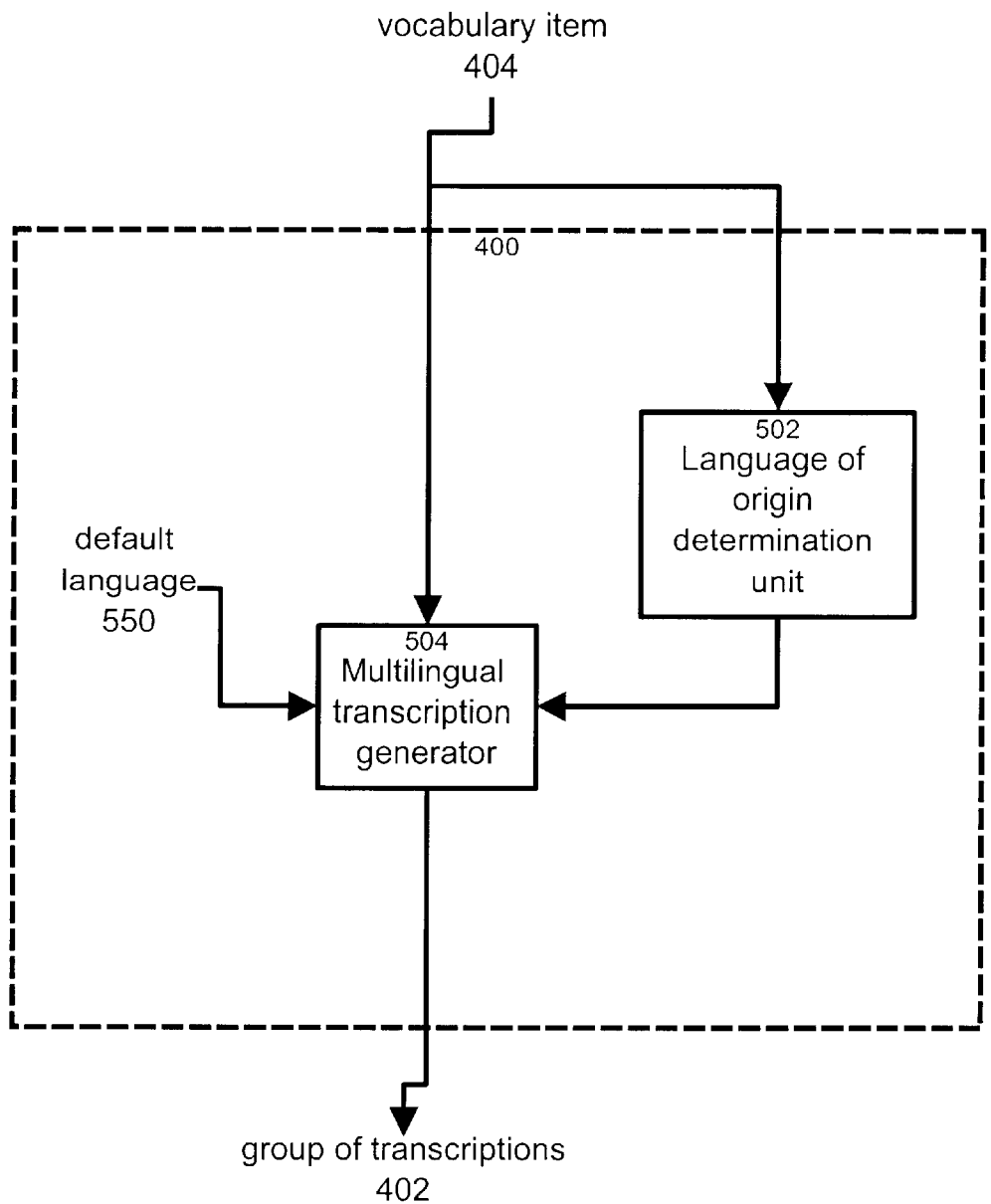
FIG. 5 shows a more detailed block diagram of the apparatus of FIG. 4.

Another specific example of implementation of the processing unit 400 is shown in FIG. 5 of the drawings. The processing unit comprises a language of origin determination unit 502 coupled to the input 404, a multi-lingual automatic transcription generator 504 coupled to the language of origin determination unit 502 and to the output 402 for releasing a group of transcriptions.

The language of origin determination unit 502 is operative to process a vocabulary item received at the input 404 to derive a characteristic from the vocabulary item allowing to divide a pool of available languages in a first sub-group and a second sub-group. The pool of available languages may be predefined in the language of origin determination unit 502 or may an external parameter stored on a computer readable medium operatively accessible by the language of origin determination unit 502. The language of origin determination unit 502 processes the vocabulary item to determine the etymological origin of the vocabulary item and assigns likelihood values to the languages in the pool of available languages, the likelihood values being based at least in part on the determined etymological origin. A number of methods well known in the art can be used to determine the etymological roots of the vocabulary item as has been discussed earlier. The first sub-group is comprised of languages having likelihood values above a certain threshold and the second sub-group is comprised of languages having likelihood values below a certain threshold. The threshold may be predefined or may be variable without detracting from the spirit of the invention. Alternatively, the first sub-group may be comprised of a fixed number of languages having the highest likelihood values in the pool of languages, while the second sub-group is the remainder languages in the pool of available languages.

The vocabulary item manifests a higher probability of belonging to any language in the first sub-group than belonging to any language in the second sub-group. In a first example of implementation, the language of origin determination unit 502 outputs data elements indicative of languages belonging to the first sub-group. In a second example, the language of origin determination unit 502 outputs data elements indicative of languages with their associated likelihood values. In a third example of implementation, the language of origin determination unit 502 outputs data elements indicative of an ordered list of languages, the ordering being effected on a basis of the likelihood values.

Figure 7:
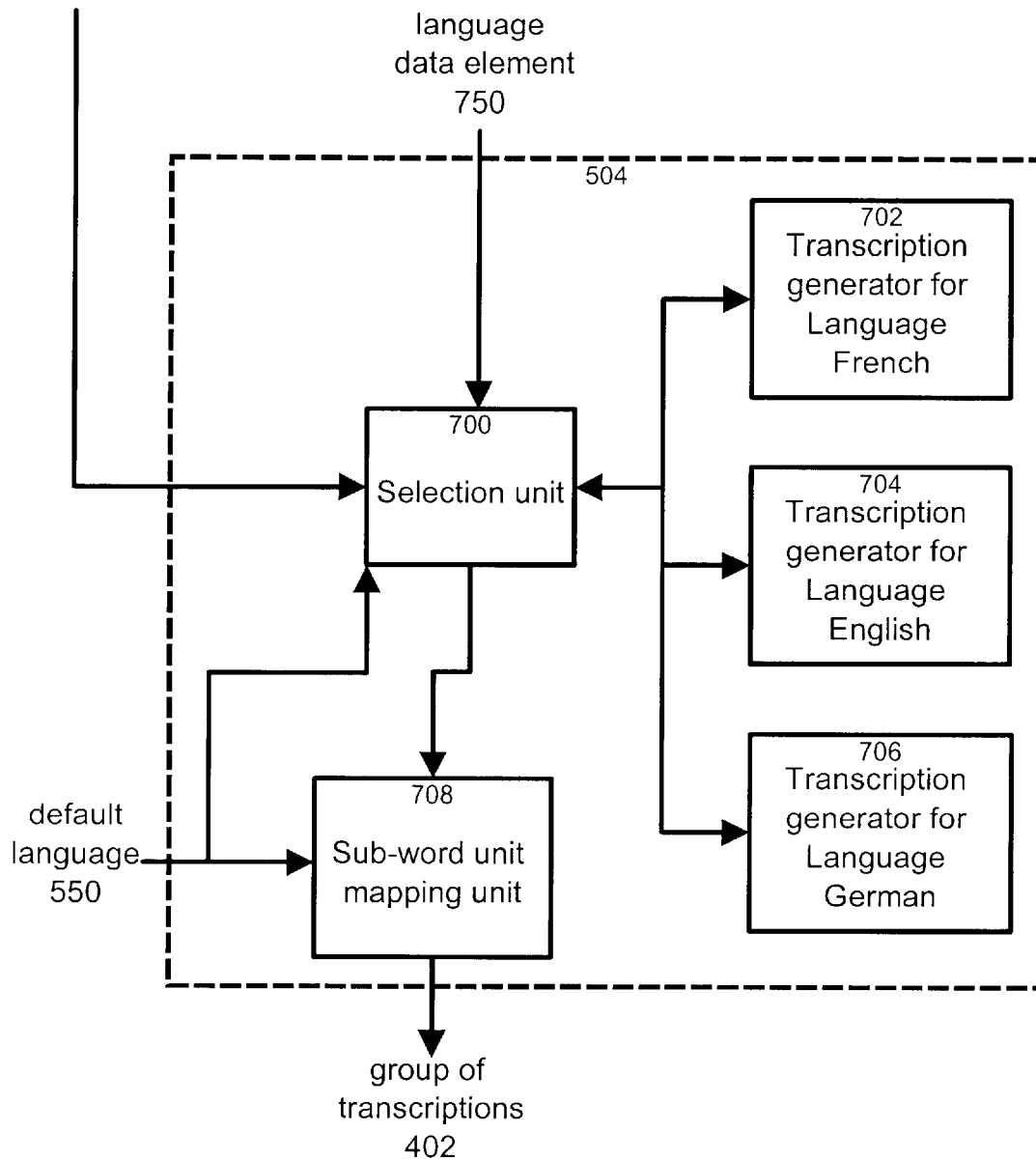
FIG. 7 shows a more detailed block diagram of the multilingual transcription generator of FIG. 5 in accordance with the invention.

The multi-lingual automatic transcription generator 504 processes the vocabulary item received at the input 404 and the languages received from the language of origin determination unit 502 to generate the group of transcriptions. A specific example of a multi-lingual automatic transcription generator 504 in accordance with the spirit of the invention is shown in FIG. 7 of the drawings. The multi-lingual automatic transcription generator 504 comprises a first input 750 for receiving data elements indicative of a list of languages, a second input for receiving a data element indicative of the vocabulary item and a set of functional units namely a selection unit 700 and a pool of language specific transcription generators 702 704 706. Each language specific transcription generator in the pool is operative to generate a transcription specific to the corresponding languages. The functioning of a language specific transcription generator is well-known in the art to which this invention pertains and will not be described further. In a first specific example, all the language specific transcription generators are active and each generates a transcription belonging to its respective languages on the basis of the vocabulary item. Following this, the selection unit 700 selects, on the basis of the language data elements, a sub-set of the transcriptions to be released in the group of transcriptions. In a second specific example, the selection unit 700 receives the list language data elements and initiates a sub-group of the language specific transcription generators on the basis of the list language data elements. More specifically, the language specific transcription generators in the pool are inactive unless the selection unit 700 initiates them.

In a first specific example of implementation of the processing unit where the language of origin determination unit 502 outputs data elements indicative of languages belonging to the first sub-group, the selection unit 700 selects the language specific transcription generators associated to the languages in the first sub-group. In a second specific example of implementation of the processing unit where the language of origin determination unit 502 outputs data elements indicative of languages with their associated likelihood values, the selection unit selects the language specific transcription generators associated to the languages having likelihood values above a certain threshold or, alternatively, language specific transcription generators associated to N languages associated to the top likelihood values in the list of data elements, where N is a determined number of languages. In a third specific example of implementation of the processing unit where the language of origin determination unit 502 outputs data elements indicative of an ordered list of languages, the selection unit selects language specific transcription generators associated to N languages in the list, where N is a determined number of languages.

As a variant, the processing unit 400 is further operative for processing the vocabulary item received at the input 404 to generate a transcription corresponding to a default language 550. In a specific example, the default language may be the language most commonly used by a user of the speech-processing device. For example, if the invention is embodied in a product for North America such as a directory assistance system, a possible default language is English since a large proportion of the population is English speaking. As yet another variant a group of languages can be used as default languages. Continuing the example of a product intended for North America, a group of default languages comprising English, French and Spanish may be used. In a typical interaction, a data element indicative of a default language is received by the selection unit 700 as part of the language data elements 750 or via a separate input as shown in FIG. 7 of the drawings. The generation of a transcription associated with the default language 550 is substantially similar to the generation of transcriptions described in connection with the data elements received at input 750. The transcription associated with the default language is then added to the group of transcriptions.

Figure 6:
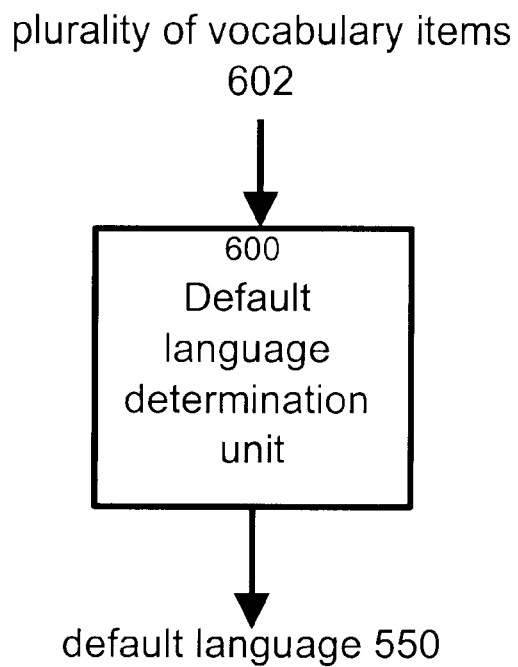
FIG. 6 shows a block diagram of a default language determination unit for use in connection with the apparatus of FIG. 5, in accordance with an alternative embodiment of the invention.

In yet another form of implementation, the default language or group of default languages is not fixed but dynamically established based on an examination of a plurality of vocabulary items. As shown in FIG. 6 of the drawings, this may be effected by a default language determination unit 600 having an input 602 for receiving a plurality of vocabulary items and an output for releasing data elements 550 indicative of at least one default language. In a specific example, the default language determination unit 600 processes each vocabulary item in the plurality of vocabulary items and determines for each a most likely etymological root language. Determining the most likely etymological root language for each vocabulary item may be effected in a similar fashion as previously described in connection with block 502. The most likely etymological root languages for the vocabulary items are then combined and the most frequently occurring language (or languages in the case of a set of default languages) is (are) released in the form of a data element by the default language determination unit 600.

Advantageously, generating for each vocabulary a transcription associated to a default language 550 in addition to transcriptions associated to a language related to the etymology of the vocabulary item allows accounting for both types of pronunciations. In addition, by limiting the number of transcriptions of the pool of languages by excluding at least one transcription associated to a language in the second sub-group of languages, an improvement in efficiency of memory usage is achieved as compared to a method providing transcriptions for all languages in a pool of languages. An additional benefit of limiting the number of transcriptions of the pool of languages by excluding at least one transcription associated to a language in the second sub-group of languages is a reduction in the search time of a speech recognizer making use of the transcriptions generated.

Preferably, the sub-transcription units of the transcriptions from languages in the first sub-group of languages are mapped onto sub-transcription units of the default language. This is particularly useful if a sub-transcription unit of a language in the first sub-group does not exist in the collection of reference sub-transcription units and a specific speech model is thus not available. This is effected by the sub-transcription mapping unit 708. Preferably, the sub-transcription units in transcriptions associated to given language selected from the pool of languages are mapped into sub-transcription units of the default language. A sub-transcription mapping unit 708 is particularly useful if a sub-transcription unit in the given language does not exist in the reference collection of sub- transcription units and a speech model is not available. In a typical interaction, the sub-transcription mapping unit receives a transcription comprising a set of sub-transcription units. The transcription is processed to determine whether each sub-transcription unit has a speech model available for use in the speech-processing device. In the affirmative, the sub-transcription mapping unit 708 releases the transcription unmodified. In the negative, the certain sub-transcription unit that does not have a speech model available for use in the speech processing device is processed to derive a substitute sub-transcript on unit from the reference collection of sub-transcription units that is acoustically similar to the certain sub-transcription unit. The certain sub-transcription unit is then replaced in the transcription by the substitute sub-transcription unit. The sub-transcription mapping unit 708 then releases the modified transcription. In the specific example where the sub-transcription units are phonemes, a nearest phoneme method is used. The nearest phoneme method is described in detail below. The skilled person in the art will readily observe that this may be applied to acoustic sub-transcription units other than phonemes without detracting from the spirit of the invention. In its broad aspect, a nearest phoneme method maps a certain phoneme to a phoneme in a collection of phonemes that is acoustically similar to the certain phoneme. The phoneme in the collection of phonemes that is acoustically similar to the certain phoneme may be determined by a human which determines the closest sounding phoneme or by a heuristic algorithm implemented on a computer readable medium.

In a specific example, the invention makes use of the feature descriptions of the phoneme. The sub-transcription mapping unit 708 computes phonemic transformation weights on the basis of phonological features of the phonemes being processed. In a typical interaction, a certain phoneme is compared against each phoneme in the reference collection of phonemes. The phoneme in the reference collection of phonemes having the lowest phonemic transformation weight is used to replace the phoneme in the transcription. The phonemic transformation weight for a phoneme pair (/x/, /y/) is based on descriptive values assigned by an expert to each phoneme. In a specific example, the phonemic transformation weights are given by:

$$W(|x|,|y|) = \sum_{i=1}^{N} \alpha_i t(f|x|, f|y|) \qquad \text{Equation 1}$$

where N is the number of phonological feature types and $\alpha_i$ is the relative significance of the feature type i. The functions f/x/ and f/y/ are the feature values of feature type i for phonemes /x/ and /y/, and t(f/x/, f/y/) is the transformation penalty between feature values f/x/ and f/y/. The meaning of feature values, feature types, and transformation cost will be illustrated further below.

Typically, each phoneme sound is described by a plurality of feature types, each of which may take on a number of values. A specific example of feature types, along with their permissible values, is shown below in Table I.

| Feature | Values |
| --- | --- |
| Voicing | voiced, unvoiced |
| Place | bilabial, labio-dental, dental, alveolar, palatal, palato-alveolar, velar, labio-velar, labio-palatal, uvular. Pharyngeal. Glottal |
| Manner | stop, fricative, nasal, approximant, vowel, lateral, trill, flap, click, ejective, implosive, affricate |
| Realization | aspirated, unexploded, syllabic, murmured, long, velarized, labialized, palatalized, rhoticized, nasalized, pharyngealized, tense |
| Frontness | front, center, back |
| Height | high, semi-high, upper-middle, middle, low |
| Roundness | rounded, unrounded |

The phoneme /a/, for example, as in the word "cat," is assigned the feature values: "low," "front," and "unrounded". These feature values correspond to the feature types "height," "frontness," and "roundness," respectively. The feature types "voicing," "place," "realization," and "manner." are not specifically defined for /a/, and accordingly, /a/ is said to have a null feature value for these feature types. Each phoneme in each language of interest is assigned corresponding feature values.

The feature types are not all equally significant in the production of a sound. For example, the significance of "manner" is stronger than that of "rounding." The relative significance value, $\alpha_i$, is used to quantify the significance of the various feature types. Preferably, the values of $\alpha_i$ are assigned by a phonetician or speech expert. These significance values are well known in the art of linguistics. In a specific example, the International Phonemic Alphabet includes descriptions of this type and may be used in the context of this invention.

In addition to the relative significance value, $\alpha_i$, transformation penalties may be used to calculate the phonemic transformation weights. The transformation penalty is a function of two feature values of a feature type, and loosely measures the acoustic consequences of changing from an articulation of one feature type to another. In a manner similar to the significance values, the transformation penalties may be determined by phoneticians or speech experts.

Using equation 1 and the transformation penalties, the phonemic transformation weights can be calculated for any phoneme symbol pair (/x/, /y/). As an example transformation weight calculation, consider the phoneme symbol pair (/b/) {voiced bilabial stop}, and /d/ (palato-alveolar). Applying equation 1, and using the appropriate values, the feature weight for place is 0.7, and the transformation penalty from "bilabial" to "palato-alveolar" is 0.3, which leads to a phoneme transformation penalty of t(/b/,/d/)=0.21.

An example will better illustrate the functioning of the sub-transcription mapping unit 708. Suppose that the vocabulary item "jota" maps to a transcription "Xota" associated to the Spanish language. The sub-transcription mapping unit 708 receives the transcription "Xota" and determines that there is no speech model available for the sub-transcription unit "X". The sub-transcription mapping unit 708 then proceeds to finding the closest sub-transcription unit from the reference collection of sub-transcription units for which a speech model is available. In this specific example, suppose that the closest sub-transcription unit is "R". Following this, the sub-transcription mapping unit 708 replaces the sub-transcription unit "X" with the sub-transcription unit "R" obtaining the substitute transcription "Rota". The substitute transcription is then released by the sub-transcription mapping unit 708.

Figure 8:
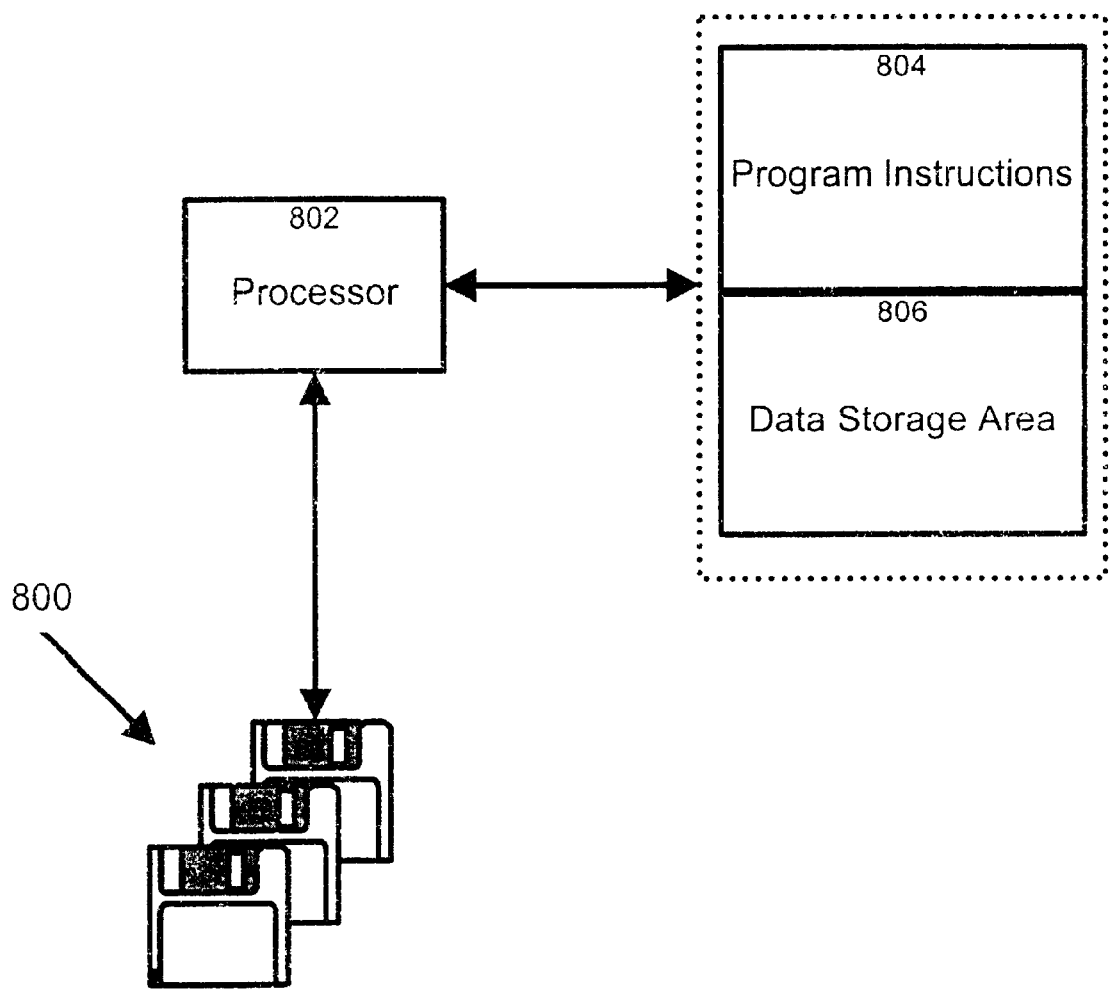
FIG. 8 shows a block diagram of an apparatus for generating a group of transcriptions in accordance with an alternative embodiment of the invention.

The above-described method for generating a group of transcriptions suitable for use in a speech processing device can also be implemented on any suitable computing platform as shown in FIG. 8. Such a computing platform typically includes a CPU 802 and a memory or computer readable medium 800 connected to the CPU 802 by a data communication bus. The memory stores the data 806 and the instructions of the program element 804 implementing the functional blocks depicted in the drawings and described in the specification. In a specific example, the program element 804 implements the processing unit 400. In a specific example, the vocabulary item processed by the processing unit 400 is stored in the data portion 806 of the memory 800. The program element 804 operates on the data 806 in accordance with the algorithms described above to generate a group transcriptions associated to a vocabulary item suitable for use in a speech processing device using the techniques described in this specification.

Figure 9:
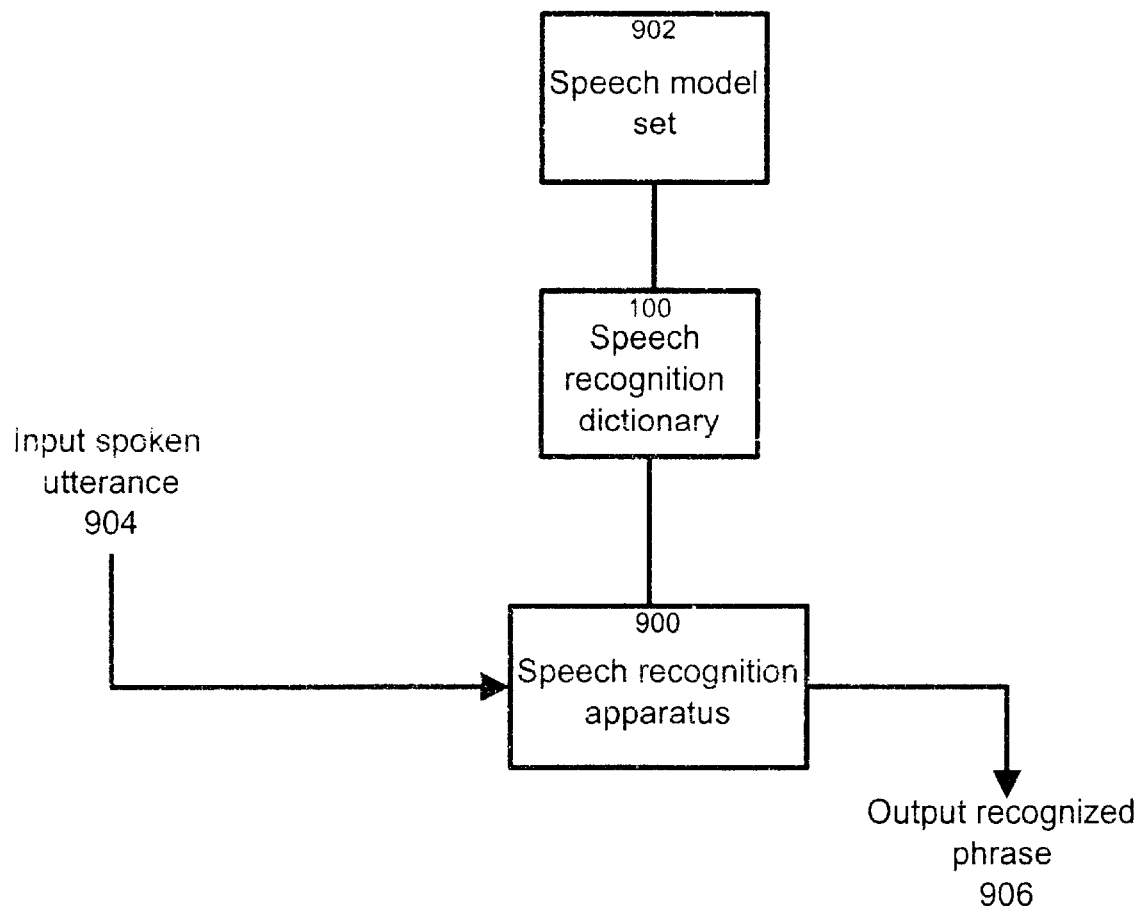
FIG. 9 shows a speech recognition apparatus incorporating the computer readable medium shown in FIG. 1.

The speech recognition dictionary 100 comprising a group of transcriptions in accordance with the spirit of the invention may be used in a speech recognition enabled system such as a directory assistance system to provide multi-pronunciation and multi-lingual speech recognition capabilities. Such a speech recognition enabled system, of the type depicted in FIG. 9, typically comprises an input 904 for receiving a signal derived from a spoken utterance, a processing unit 900 implementing speech recognition functionality and an output 906 for releasing the recognition results. The processing unit 900 is coupled to the speech recognition dictionary 100 having a plurality of vocabulary items. At least some vocabulary items in the speech recognition dictionary 100 are associated to at least two transcriptions generated by the method described in this specification. The speech recognition dictionary 100 is coupled to a speech model set 902 thereby providing an association between acoustic sub-transcription units in the transcriptions and the speech models in the speech model set 902. During the speech recognition process, the processing unit 900 makes use the speech models in the speech model set 902 to score the input utterance to obtain a match to the recognition result in the speech recognition dictionary 100. The functioning of a processing unit 900 providing speech recognition functionality is well-known in the art to which this invention pertains and consequently will not be described in further detail.

As a variant the method and apparatus for generating a group of transcriptions may be used in the context of a text to speech synthesizer in order to generate a most suitable pronunciation for a vocabulary item. Typically, text to speech synthesizers allow a single pronunciation to be selected for synthesis on a basis of an orthographic representation of the vocabulary item. The text to speech synthesizer makes use of the methods described in this specification to generate a group of transcriptions on a basis of a vocabulary item. The top selection of the group of transcriptions is then selected for synthesis. A further selection operation may be made between the default language and the language selected from the pool of languages having the highest likelihood. In a specific example, a threshold likelihood value is established whereby when a likelihood value for a given language selected from the pool of languages is above the threshold, a transcription associated to the given language is used by the text to speech synthesizer. Otherwise the transcription associated with the default language is used. Other schemes can be used here without departing from the spirit of the invention as will be readily apparent to those skilled in the art. The use of the method and apparatus provided in this specification allows multi-language pronunciations to be generated by a same text to speech synthesizer.

Although the present invention has been described in considerable detail with reference to certain preferred embodiments thereof, variations and refinements are possible without departing from the spirit of the invention. Therefore, the scope of the invention should be limited only by the appended claims and their equivalents.

In accordance with a broad aspect, the invention provides a computer readable storage medium comprising a data structure containing a speech recognition dictionary suitable for use in a speech recognizer. The speech recognition dictionary comprises a set of vocabulary items including a sub-set of vocabulary items. Each vocabulary item in the sub-set is associated to a group of transcriptions belonging to languages selected from a pool of available languages. Each vocabulary item in the sub-set of vocabulary items has characteristics allowing the division of the pool of available languages into a first sub-group and a second sub-group. The vocabulary item manifests a higher probability of belonging to any language in the second sub- group. The group of transcriptions associated with each vocabulary item from the sub-set of vocabulary items is characterized by the absence of at least one transcription belonging to a language in the second sub-group of languages established for the vocabulary item.

The advantage of this data structure over prior art data structures resides in the reduction of unnecessary transcriptions.

In a specific example of implementation, the vocabulary items in the sub-set are further associated to transcriptions belonging to a common default language.

Preferably, but not essentially, a characteristic allowing to divide the pool of available languages in the first sub-group and the second sub-group is the etymology of the vocabulary item.

In accordance with another broad aspect, the invention further provides a method for generating a group of transcriptions suitable for use in a speech processing device. The method comprises providing a vocabulary item and processing it to derive a characteristic allowing to divide a pool of available languages in a first sub-group and a second sub-group. The vocabulary item manifests a higher probability of belonging to any language in the first sub-group than belonging to a language in the second sub-group. The method further comprises processing the vocabulary item to generate a group of transcriptions, the group of transcriptions being characterized by the absence of at least one transcription belonging to a language in the second sub-group of languages established for the vocabulary item. Optionally, the method further comprises storing the group of transcriptions on a computer readable storage medium in a format suitable for use by a speech-processing device.

Preferably, but not essentially, the method provides processing the vocabulary item to generate transcriptions corresponding to each language belonging to the first sub-group.

Preferably, but not essentially, the characteristic allowing to divide the pool of available languages in the first sub-group and the second sub-group is the etymology of the vocabulary item.

In accordance with another broad aspect, the invention further provides an apparatus for implementing the above-described method.

In accordance with another broad aspect, the invention provides a computer readable medium comprising a program element suitable for execution by a computing apparatus for implementing the above-described method.

In accordance with another broad aspect, the invention further provides a computer readable medium containing a speech recognition dictionary comprising transcriptions generated by the above-described method.

What is claimed is:

1. A computer readable storage medium, comprising:
   a data structure having a speech recognition dictionary suitable for use in a speech recognizer, the speech recognition dictionary comprising,
   a set of vocabulary items, the set of vocabulary items including a sub-set of vocabulary items wherein,
      each vocabulary item in the sub-set is associated to a group of transcriptions belonging to languages selected from a pool of available languages,
      each vocabulary item in the sub-set of vocabulary items having characteristics allowing division of the pool of available languages into a first sub-group and a second sub-group,
      the vocabulary items manifest a higher probability of belonging to any one of the languages in the first sub-group than belonging to any language in the second sub-group, and
      the group of transcriptions associated with each vocabulary item from the sub-set of vocabulary items is characterized by the absence of at least one transcription belonging to a language in the second sub-group of languages established for the vocabulary item.

2. A computer readable storage medium in accordance with claim 1 wherein the group of transcriptions associated with each vocabulary item from the sub-set of vocabulary items is characterized by the absence of a transcription belonging to any one of the languages in the second sub-group of languages established for the vocabulary item.

3. A computer readable storage medium in accordance with claim 1 wherein each vocabulary item in the sub-set is associated to transcriptions belonging to a common default language.

4. A computer readable storage medium in accordance with claim 1 wherein the vocabulary item is characterized by a certain etymology, and wherein one of the characteristics of the vocabulary item allowing division of the pool of available languages into the first sub-group and the second sub-group is the etymology of the vocabulary item.

5. A computer readable storage medium in accordance with claim 4 wherein the vocabulary item is an orthography.

6. A method for generating a group of transcriptions suitable for use in a speech processing device, the method comprising:

providing a vocabulary item;

processing the vocabulary item to derive a characteristic from the vocabulary item allowing division of a pool of available languages into a first sub-group and a second sub-group, the vocabulary item manifesting a higher probability of belonging to any one of the languages in the first sub-group than belonging to any language in the second sub-group;

processing the vocabulary item to generate a group of transcriptions, the group of transcriptions being characterized by the absence of at least one transcription belonging to a language in the second sub-group of languages established for the vocabulary item;

storing the group of transcriptions in a format suitable for use by a speech processing device.

7. A method in accordance with claim 6 further comprising processing the vocabulary item to generate a transcription corresponding to each language in the first sub-group.

8. A method in accordance with claim 6 wherein the group of transcriptions is characterized by the absence of a transcription belonging to any one of the languages in the second sub-group of languages established for the vocabulary item.

9. A method in accordance with claim 8 further comprising processing all vocabulary items in a sub-set of vocabulary items to generate for each vocabulary item in the sub-group a transcription belonging to a common default language.

10. A method in accordance with claim 6 wherein the vocabulary item is characterized by a certain etymology, and the derived characteristic allowing division of the pool of available languages into the first sub-group and the second sub-group is the etymology of the vocabulary item.

11. An apparatus for generating a group of transcriptions suitable for use in a speech processing device, the apparatus comprising:

an input for receiving a signal conveying data representative of a vocabulary item;

a processing unit coupled to the input, the processing unit operable for:

processing the vocabulary item to derive a characteristic from the vocabulary item allowing division of a pool of available languages into a first sub-group and a second sub-group, the vocabulary item manifesting a higher probability of belonging to any one of the languages in the first sub-group than belonging to any language in the second sub-group, and processing the vocabulary item to generate a group of transcriptions, the group of transcriptions characterized by the absence of at least one transcription belonging to a language in the second sub-group of languages established for the vocabulary item; and an output coupled to the processing unit for releasing a signal representative of the group of transcriptions.

12. An apparatus in accordance with claim 11 wherein the speech processing device is a speech synthesizer.

13. An apparatus in accordance with claim 11 the processing unit further comprising:

a processor; and a computer readable storage medium coupled to the processor, the computer readable storage medium comprising a program element for execution by the processor for implementing the processing unit.

14. An apparatus in accordance with claim 11, the processing unit further comprising:

a language of origin determination unit for processing the vocabulary item to derive a characteristic from said vocabulary item allowing division of a pool of available languages into the first sub-group and the second sub-group; and a multi-lingual automatic transcription generator coupled to the language of origin determination unit for processing the vocabulary item to generate the group of transcriptions.

15. An apparatus in accordance with claim 14 further comprising a sub-transcription mapping unit operative to map at least a first sub-transcription unit in a transcription, the first sub-transcription unit belonging to a first language, to at least a second sub-transcription unit belonging to a second language.

16. An apparatus in accordance with claim 11 wherein the processing unit is operative for processing the vocabulary item to generate a group of transcriptions corresponding to languages in the pool of available languages, the group of transcriptions characterized by the absence of a transcription from any of the languages in the second sub-group of languages established for the vocabulary item.

17. An apparatus in accordance with claim 11 wherein the vocabulary item is characterized by a certain etymology, the characteristic allowing division of the pool of available languages into the first sub-group and the second sub-group is the etymology of the vocabulary item.

18. An apparatus in accordance with claim 11 wherein the vocabulary item is an orthography.

19. An apparatus for generating a group of transcriptions suitable for use in a speech processing device, the apparatus comprising:

means for receiving data elements representative of a vocabulary item;

means for processing the vocabulary item to derive a characteristic from the vocabulary item allowing division of a pool of available languages into a first sub-group and a second sub-group, the vocabulary item manifesting a higher probability of belonging to any one of the languages in the first sub-group than belonging to any language in the second sub-group;

means for processing the vocabulary item to generate a group of transcriptions, the group of transcriptions characterized by the absence of at least one transcription belonging to a language in the second sub-group of languages established for the vocabulary item; and means for releasing the group of transcriptions in a format suitable for use by a speech processing device.

20. An apparatus in accordance with claim 19 wherein the derived characteristic is the etymology of the vocabulary item.

* * * * *